(12) United States Patent
Okada et al.

(10) Patent No.: US 11,898,033 B2
(45) Date of Patent: Feb. 13, 2024

(54) OXYMETHYLENE COPOLYMER RESIN COMPOSITION AND METHOD FOR PRODUCING SAME

(71) Applicant: MITSUBISHI GAS CHEMICAL COMPANY, INC., Tokyo (JP)

(72) Inventors: Takuya Okada, Mie (JP); Daisuke Sunaga, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/920,443

(22) PCT Filed: May 31, 2021

(86) PCT No.: PCT/JP2021/020580
§ 371 (c)(1),
(2) Date: Oct. 21, 2022

(87) PCT Pub. No.: WO2021/251189
PCT Pub. Date: Dec. 16, 2021

(65) Prior Publication Data
US 2023/0120116 A1    Apr. 20, 2023

(30) Foreign Application Priority Data
Jun. 10, 2020   (JP) ................. 2020-101224

(51) Int. Cl.
*C08L 71/02*   (2006.01)
*C08G 65/40*   (2006.01)

(52) U.S. Cl.
CPC .......... *C08L 71/02* (2013.01); *C08G 65/4025* (2013.01); *C08G 65/4068* (2013.01)

(58) Field of Classification Search
CPC ................ C08L 71/02; C08G 65/4025; C08G 65/4068
USPC ............................................................ 528/86
See application file for complete search history.

(56) References Cited

U.S. PATENT DOCUMENTS

| | | |
|---|---|---|
| 4,675,356 A | 6/1987 | Miyata |
| 6,072,021 A | 6/2000 | Adelman et al. |
| 6,753,363 B1 | 6/2004 | Harashina |
| 2020/0216598 A1* | 7/2020 | Yamamoto ............... C08G 2/06 |
| 2022/0056259 A1 | 2/2022 | Okada et al. |

FOREIGN PATENT DOCUMENTS

| | | |
|---|---|---|
| EP | 0619344 A2 | 10/1994 |
| JP | S61-174270 A | 8/1986 |
| JP | 2003-510374 A | 3/2003 |

(Continued)

OTHER PUBLICATIONS

Katsukawa et al., JP 2004-002506 A machine translation in English, Jan. 8, 2004 (Year: 2004).*

(Continued)

*Primary Examiner* — David T Karst
(74) *Attorney, Agent, or Firm* — Greenblum & Bernstein, P.L.C.

(57) ABSTRACT

An oxymethylene copolymer resin composition, which includes (i) an oxymethylene copolymer, (ii) a derivative of an aryl boron fluoride compound, and (iii) a layered double hydroxide; and a method for producing the same.

14 Claims, 4 Drawing Sheets

(56) References Cited

FOREIGN PATENT DOCUMENTS

| JP | 2004002506 A | * | 1/2004 | ............. C08G 65/30 |
|----|---|---|---|---|
| JP | 2011-137087 A | | 7/2011 | |
| JP | 2017-165835 A | | 9/2017 | |
| JP | 2019-65221 A | | 4/2019 | |
| WO | WO 01/05888 A1 | | 1/2001 | |
| WO | WO-2017159602 A1 | * | 9/2017 | ............... C08G 2/06 |
| WO | WO 2020/250945 A1 | | 12/2020 | |
| WO | WO 2021/182242 A1 | | 9/2021 | |

OTHER PUBLICATIONS

ISR for PCT/JP2021/020580, dated Aug. 10, 2021.
Notice of Reasons for Refusal for JP App. No. 2021-557256, dated Apr. 20, 2022 (w/ translation).
Decision to Grant a Patent for JP App. No. 2021-557256, dated Jul. 20, 2022 (w/ translation).
Extended European Search Report dated Sep. 7, 2023 in European Family Member European Application No. EP 21821087.0.

* cited by examiner

[Figure 1]
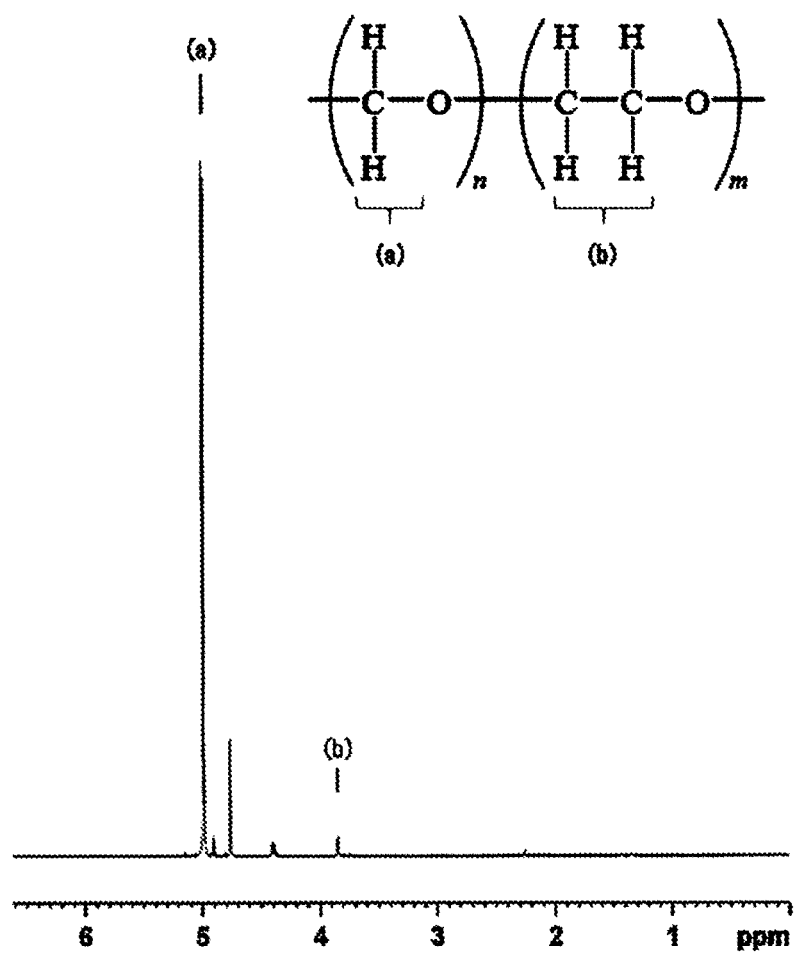

[Figure 2]
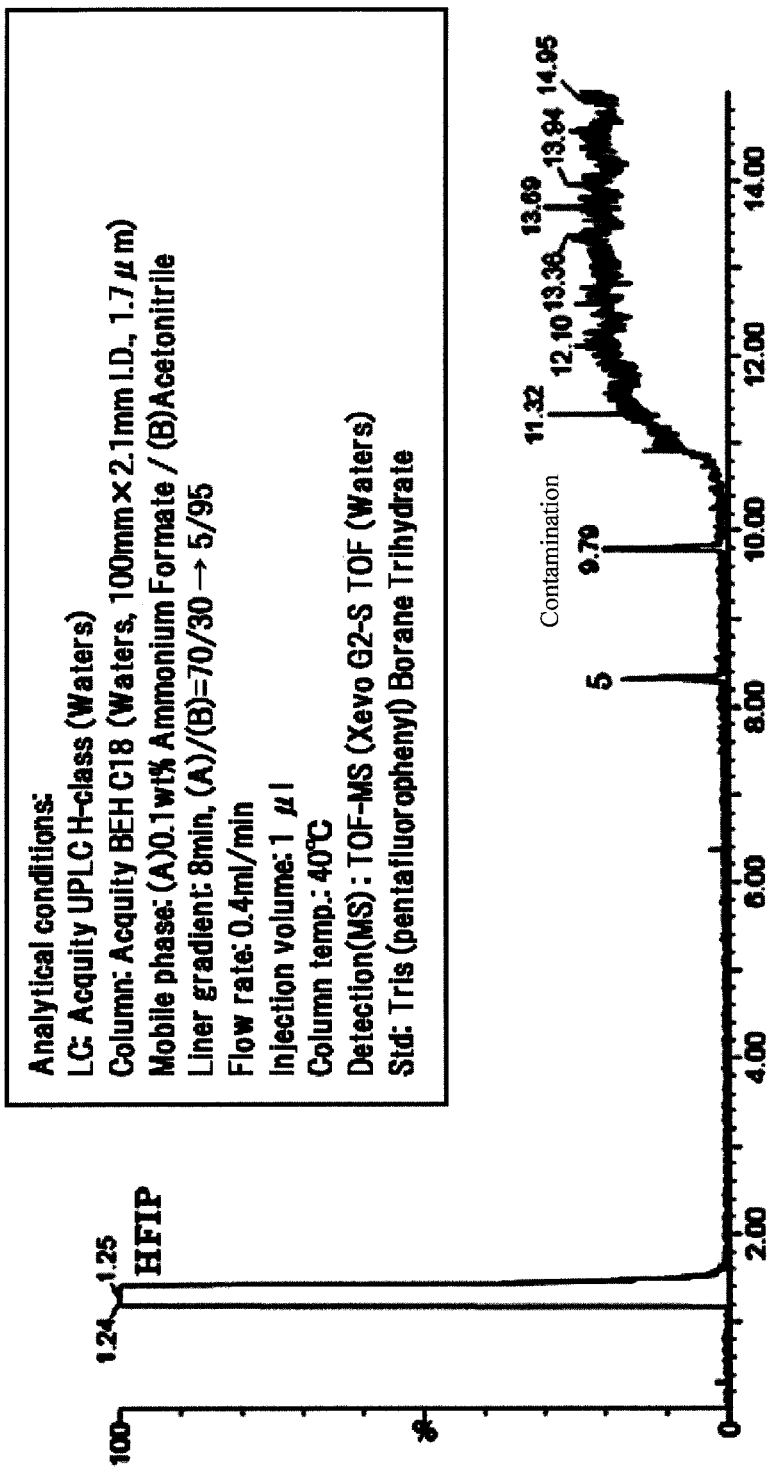

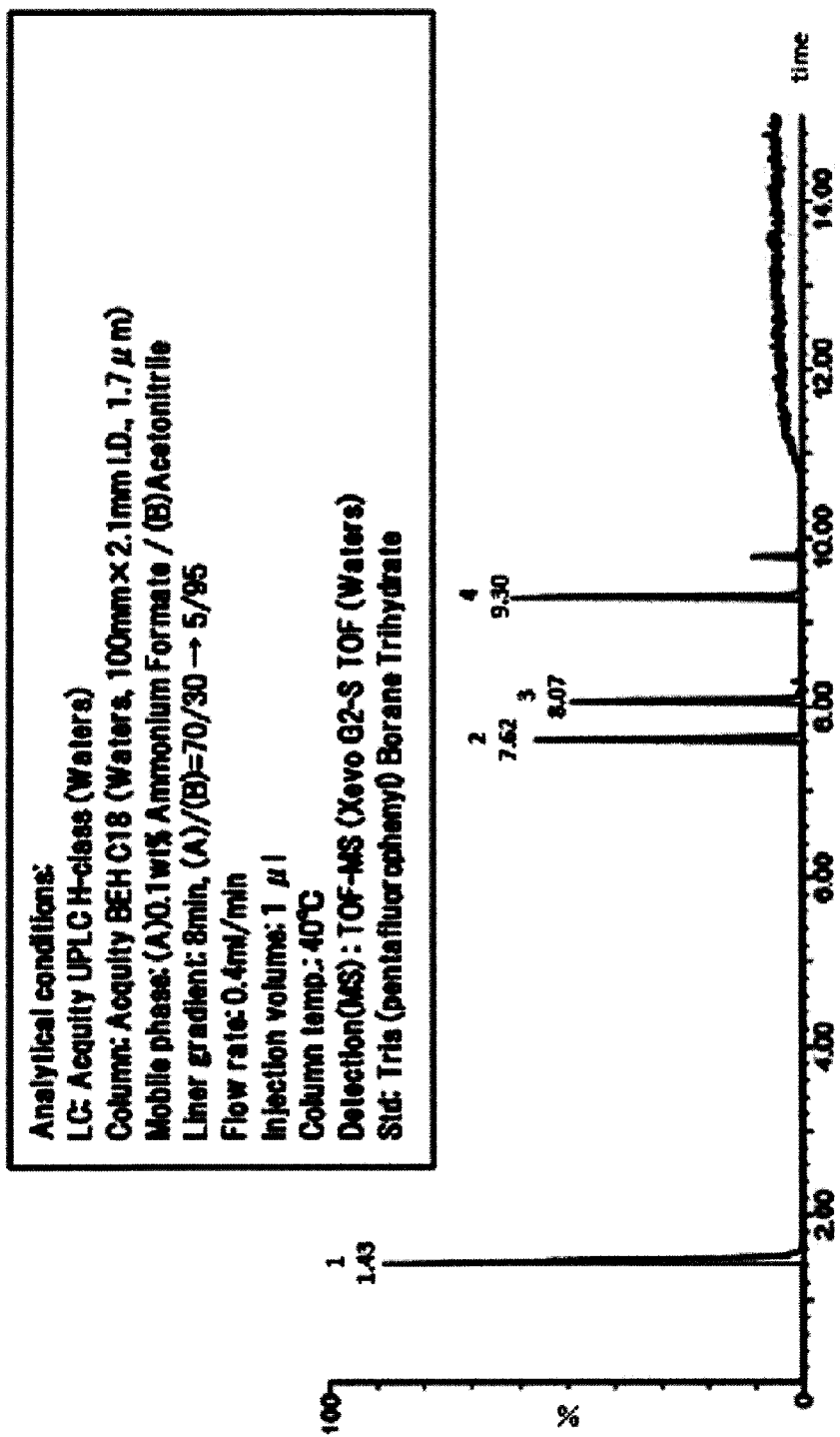
[Figure 3]

[Figure 4]
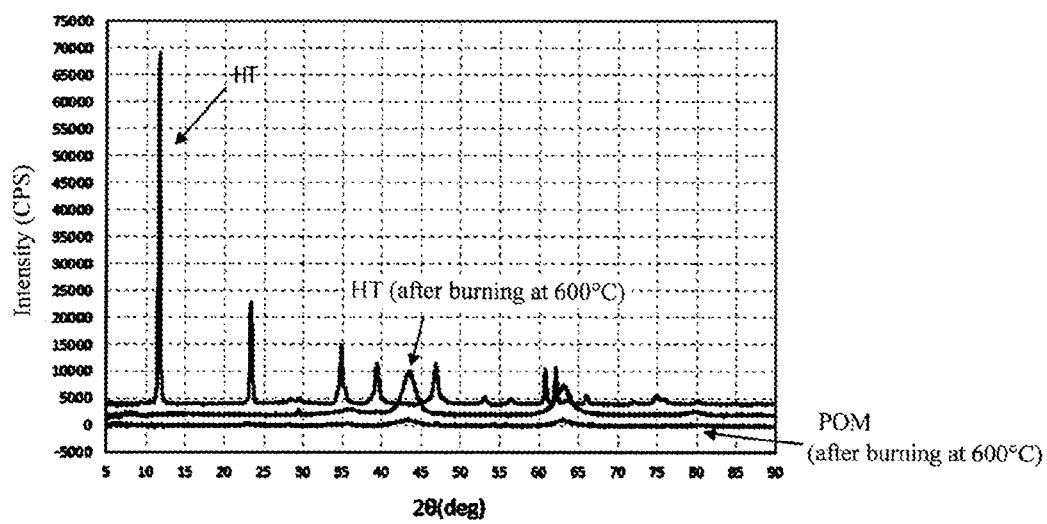
[Figure 5]
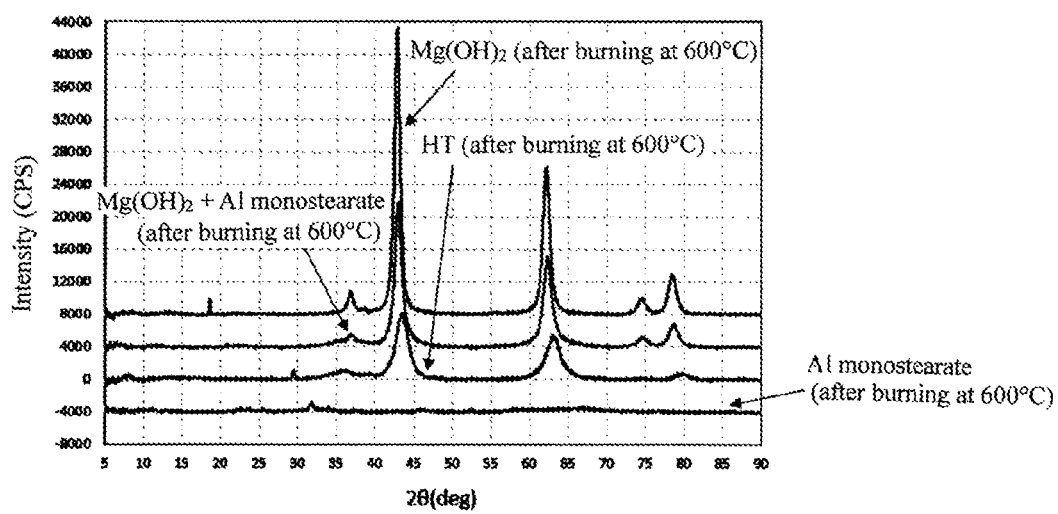

OXYMETHYLENE COPOLYMER RESIN COMPOSITION AND METHOD FOR PRODUCING SAME

TECHNICAL FIELD

The present invention relates to an oxymethylene copolymer resin composition, in which a boron trifluoride compound, an aryl boron fluoride compound, and a layered double hydroxide are used, and a method for producing the same.

BACKGROUND ART

Oxymethylene polymer is also referred to as polyacetal, and it is a copolymer, in which a formaldehyde-polymerized homopolymer, a cyclic oligomer such as trioxane, and a comonomer are polymerized.

Oxymethylene polymer has excellent balance among mechanical properties, drug resistance, sliding property, and the like, and also has easy processing. Thus, the oxymethylene polymer has been widely used as a typical engineering plastic, mainly in various types of mechanical parts, such as electrical/electronic parts and automobile parts.

When such an oxymethylene copolymer is industrially produced in a large volume, since a resin temperature increases in a polymerization reactor, a large amount of unreacted trioxane vaporizes. Hence, defects in stable production and a reduction in the yield have been concerned. In addition, in order to produce a high rigidity-grade oxymethylene copolymer, it is necessary to produce an oxymethylene copolymer with a low comonomer content to increase the degree of crystallinity. In this case, however, the reaction temperature significantly increases due to high reaction activity, and a large amount of unreacted trioxane vaporizes. Hence, it has been concerned that the production of an oxymethylene copolymer with a low comonomer content would lead to a reaction in the yield.

In order to solve the problems, such as defects in stable production caused by vaporized unreacted trioxane or a reduction in the yield, Patent Literature 1 discloses a method for producing a polyacetal copolymer, comprising mixing (a) a trioxane, (b) a cyclic ether and/or a cyclic formal, and (c) a tertiary amine compound, and then adding a polymerization catalyst to the obtained mixture. According to the production method disclosed in Patent Literature 1, a large amount of tertiary amine compound is added as a polymerization activity-controlling agent before addition of a catalyst, and is mixed with a monomer, so that a polyacetal copolymer is produced at a high yield, while suppressing vaporization of an unreacted monomer. However, from the viewpoint of producing a high-molecular-weight oxymethylene copolymer at a high yield, it has been desired to establish another method that is different from the production method of Patent Literature 1.

Patent Literature 2 discloses a polyacetal resin composition comprising 100 parts by mass of polyacetal resin (A), 0.001 to 5.0 parts by mass of organic phosphoric acid compound (B), and 0.001 to 5.0 parts by mass of layered double hydroxide (C). However, the polyacetal resin composition of Patent Literature 2 has had room for improvement in terms of polymerization degree, yield, and odor.

Japanese Patent Application No. 2019-108702 that is a patent application filed by the present inventors relates to a method for producing an oxymethylene polymer, comprising polymerizing a cyclic oligomer of formaldehyde to produce an oxymethylene polymer. According to the production method of Japanese Patent Application No. 2019-108702, a boron trifluoride compound (A) and an aryl boron fluoride compound (B) are used as polymerization catalysts. According to the production method of Japanese Patent Application No. 2019-108702, an oxymethylene polymer having a high degree of polymerization can be produced with high efficiency, and further, generation of odor can be suppressed. However, regarding this production method, there has been room for improvement.

CITATION LIST

Patent Literature

Patent Literature 1: JP Patent Publication (Kokai) No. 2011-137087 A

Patent Literature 2: JP Patent Publication (Kokai) No. 2017-165835 A

SUMMARY OF INVENTION

Technical Problem

It has been desired to develop a method for producing a resin composition comprising an oxymethylene copolymer having a high degree of polymerization at a high yield, wherein the method can further produce an oxymethylene copolymer resin composition with suppressed odor generation when it is processed into a molded body.

Moreover, it has been desired to develop an oxymethylene copolymer resin composition with suppressed odor generation when it is processed into a molded body.

Solution to Problem

According to the present invention, the following inventions are provided. [1] An oxymethylene copolymer resin composition, characterized in that it comprises (i) an oxymethylene copolymer comprising an oxymethylene unit and an oxyalkylene unit containing 2 or more carbon atoms, (ii) a derivative of an aryl boron fluoride compound, and (iii) a layered double hydroxide represented by the following general formula (1):

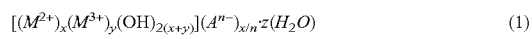

$$[(M^{2+})_x(M^{3+})_y(OH)_{2(x+y)}](A^{n-})_{x/n} \cdot z(H_2O) \qquad (1)$$

wherein $M^{2+}$ represents a divalent metal ion, $M^{3+}$ represents a trivalent metal ion, $A^{n-}$ represents an n-valent anion and may comprise a plurality of anions, x represents a range of $0 < x \leq 6.0$, n represents an integer of 1 to 3, and y and z each represent a number of 0 or greater.

[2] The oxymethylene copolymer resin composition according to the above [1], wherein the content of (iii) the layered double hydroxide is 0.003 to 1 parts by mass, based on 100 parts by mass of (i) the oxymethylene copolymer.

[3] The oxymethylene copolymer resin composition according to the above [1] or [2], wherein (ii) the derivative of the aryl boron fluoride compound is a fluorine adduct of an aryl boron fluoride compound.

[4] The oxymethylene copolymer resin composition according to any one of the above [1] to [3], which further comprises (iv) 0.01 to 1 part by mass of hindered phenolic antioxidant, based on 100 parts by mass of (i) the oxymethylene copolymer.

[5] The oxymethylene copolymer resin composition according to any one of the above [1] to [4], wherein the aryl boron fluoride compound is at least one type selected from the group consisting of tris(pentafluorophenyl)borane, bis(pentafluorophenyl)fluoroborane, pentafluorophenyldifluoroborane, and their hydrates.

[6] The oxymethylene copolymer resin composition according to any one of the above [3] to [5], wherein
the fluorine adduct of the aryl boron fluoride compound is derived from (ii') an aryl boron fluoride compound and (ii") a boron trifluoride compound represented by $BF_3 \cdot (\alpha)_m$ (wherein m represents 0 or 1, and α represents alkyl ether containing 2 to 20 carbon atoms, tetrahydrofuran, or phenol), and
the molar ratio B1/B2 of the amount of boron derived from (ii') the aryl boron fluoride compound (B1) to the amount of boron derived from (ii") the boron trifluoride compound (B2) is 0.0001 to 0.1.

[7] The oxymethylene copolymer resin composition according to any one of the above [1] to [6], wherein (iii) the layered double hydroxide is a hydrotalcite.

[8] The oxymethylene copolymer resin composition according to any one of the above [1] to [7], wherein, in the general formula (1), $M^{2+}$ is $Mg^{2+}$, $M^{3+}$ is $Al^{3+}$, and $A^{n-}$ is $CO_3^{2-}$ and/or $OH^-$.

[9] The oxymethylene copolymer resin composition according to any one of the above [1] to [8], which further comprises (v) 0.01 to 0.3 parts by mass of nitrogen-containing compound, based on 100 parts by mass of (i) the oxymethylene copolymer.

[10] The oxymethylene copolymer resin composition according to the above [9], wherein (v) the nitrogen-containing compound is at least one type selected from the group consisting of an amino-substituted triazine compound, a polyamide resin, and a hindered amine compound.

[11] A method for producing an oxymethylene copolymer resin composition, comprising:
a step of performing a copolymerization reaction, using (i') trioxane as a main monomer, (i") cyclic ether and/or cyclic formal having at least one carbon-carbon bond, as a comonomer, and (ii') an aryl boron fluoride compound and (ii") a boron trifluoride compound represented by $BF_3 \cdot (\alpha)_m$ (wherein m represents 0 or 1 and α represents alkyl ether containing 2 to 20 carbon atoms, tetrahydrofuran, or phenol), as reaction initiators, to obtain a reaction product comprising (i) an oxymethylene copolymer, and
a step of adding (iii) a layered double hydroxide represented by the following general formula (1) to the obtained reaction product, wherein
the production method is characterized in that the additive amount of (iii) the layered double hydroxide is 0.003 to 1 parts by mass, based on 100 parts by mass of (i) the oxymethylene copolymer,

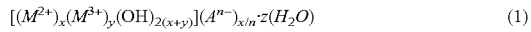

wherein $M^{2+}$ represents a divalent metal ion, $M^{3+}$ represents a trivalent metal ion, $A^{n-}$ represents an n-valent anion and may comprise a plurality of anions, x represents a range of $0 < x \leq 6.0$, n represents an integer of 1 to 3, and y and z each represent a number of 0 or greater.

[12] The method for producing an oxymethylene copolymer resin composition according to the above [11], which further comprises adding (iv) 0.01 to 1 part by mass of hindered phenolic antioxidant, based on 100 parts by mass of (i) the oxymethylene copolymer.

[13] The method for producing an oxymethylene copolymer resin composition according to the above [11] or [12], wherein the a is at least one type selected from the group consisting of dimethyl ether, diethyl ether, and dibutyl ether.

[14] The method for producing an oxymethylene copolymer resin composition according to any one of the above [11] to [13], wherein (ii') the aryl boron fluoride compound is at least one type selected from the group consisting of tris(pentafluorophenyl)borane, bis(pentafluorophenyl)fluoroborane, pentafluorophenyldifluoroborane, and their hydrates.

[15] The method for producing an oxymethylene copolymer resin composition according to any one of the above [11] to [14], wherein (ii') the aryl boron fluoride compound is used in a range of a molar ratio of 0.0001 or more and less than 1, with respect to (ii") the boron trifluoride compound.

[16] The method for producing an oxymethylene copolymer resin composition according to any one of the above [11] to [15], wherein (ii') the aryl boron fluoride compound and (ii") the boron trifluoride compound are previously mixed with each other to prepare a reaction initiator mixture, and the reaction initiator mixture is used.

[17] The method for producing an oxymethylene copolymer resin composition according to any one of the above [11] to [16], wherein (iii) the layered double hydroxide is a hydrotalcite.

[18] The method for producing an oxymethylene copolymer resin composition according to any one of the above [11] to [17], wherein, in the general formula (1), $M^{2+}$ is $Mg^{2+}$, $M^{3+}$ is $Al^{3+}$, and $A^{n-}$ is $CO_3^{2-}$ and/or $OH^-$.

[19] The method for producing an oxymethylene copolymer resin composition according to any one of the above [11] to [18], which comprises adding (v) 0.01 to 0.3 parts by mass of nitrogen-containing compound, based on 100 parts by mass of (i) the oxymethylene copolymer.

[20] The method for producing an oxymethylene copolymer resin composition according to the above [19], wherein (v) the nitrogen-containing compound is at least one type selected from the group consisting of an amino-substituted triazine compound, a polyamide resin, and a hindered amine compound.

An oxymethylene copolymer resin composition obtained by the production method according to any one of the above [11] to [20].

Advantageous Effects of Invention

According to the production method of the present invention, a resin composition comprising an oxymethylene copolymer having a high degree of polymerization can be produced at a high yield. In addition, when the oxymethylene copolymer resin composition of the present invention is used in molding, in particular, when the oxymethylene copolymer resin composition of the present invention is preserved in a high temperature and humidity environment and is then used in molding, odor generation from the obtained molded body is suppressed.

BRIEF DESCRIPTION OF DRAWINGS

FIG. 1 shows the 1H-NMR spectrum of the sample obtained in Example 2.

FIG. 2 shows the mass chromatogram of the sample obtained in Example 2.

FIG. 3 shows the mass chromatogram of tris(pentafluorophenyl)borane trihydrate in a hexafluoroisopropanol/methanol solution.

FIG. 4 shows the XRD pattern of the sample obtained in Example 2.

FIG. 5 shows the XRD patterns of a burned product of magnesium hydroxide, a burned product of aluminum monostearate, a burned product of a mixture consisting of magnesium hydroxide and aluminum monostearate, and a burned product of hydrotalcite.

DESCRIPTION OF EMBODIMENTS

One aspect of the present invention relates to a method for producing a resin composition comprising (i) an oxymethylene copolymer (hereinafter also referred to as an "oxymethylene copolymer resin composition"), the method comprising polymerizing (i') trioxane as a main monomer, with (i") cyclic ether and/or cyclic formal having at least one carbon-carbon bond, as a comonomer (hereinafter, this production method is also referred to as "the production method of the present invention").

<(i') Main Monomer>

In the production method of the present invention, as (i') a main monomer, trioxane that is a cyclic trimer of formaldehyde is used.

The trioxane is not particularly limited, as long as it is a cyclic trimer of formaldehyde. The trioxane may be either a commercially available product or a trioxane produced according a conventionally known production method. Moreover, the method for producing the trioxane is not particularly limited, either.

The trioxane may comprise water, formic acid, methanol, and/or formaldehyde, as impurities that are inevitably generated upon the industrial production thereof. The trioxane comprising these impurities can also be used. In such a case, the total amount of water, formic acid, methanol, and/or formaldehyde contained in the trioxane is preferably 500 ppm by mass or less, more preferably 450 ppm by mass or less, and particularly preferably 400 ppm by mass or less. Among others, the water content is preferably 200 ppm by mass or less, more preferably 100 ppm by mass or less, and particularly preferably 50 ppm by mass or less. If the amount of such impurities is too large, it is likely that problems, such as a reduction in the polymerization degree and odor generation from oxymethylene copolymer products, would occur.

<(i") Comonomer>

As (i") a comonomer, cyclic ether or cyclic formal having at least one carbon-carbon bond is used.

Examples of the cyclic ether or cyclic formal having at least one carbon-carbon bond may include 1,3-dioxolane, 2-ethyl-1,3-dioxolane, 2-propyl-1,3-dioxolane, 2-butyl-1,3-dioxolane, 2,2-dimethyl-1,3-dioxolane, 2-phenyl-2-methyl-1,3-dioxolane, 4-methyl-1,3-dioxolane, 2,4-dimethyl-1,3-dioxolane, 2-ethyl-4-methyl-1,3-dioxolane, 4,4-dimethyl-1,3-dioxolane, 4,5-dimethyl-1,3-dioxolane, 2,2,4-trimethyl-1,3-dioxolane, 4-hydroxymethyl-1,3-dioxolane, 4-butyloxymethyl-1,3-dioxolane, 4-phenoxymethyl-1,3-dioxolane, 4-chloromethyl-1,3-dioxolane, 1,3-dioxabicyclo[3,4,0]nonane, ethylene oxide, propylene oxide, butylene oxide, epichlorohydrin, styrene oxide, oxytane, 3,3-bis(chloromethyl)oxetane, tetrahydrofuran, oxepanes such as 1,3-dioxepane, oxocanes such as 1,3,6-trioxocane, and further, oxetanes. The comonomer is preferably cyclic formal having an oxyalkylene group (—OCH$_2$CH$_2$—) containing 2 carbon atoms, and is particularly preferably 1,3-dioxolane.

The amount of the comonomer mixed may be determined, as appropriate, depending on the type of the comonomer, the physical properties of (i) the oxymethylene copolymer as a final product of interest, etc. The amount of the comonomer is preferably 0.1 to 20 parts by mass, and particularly preferably 1 to 15 parts by mass, with respect to 100 parts by mass of (i') the trioxane.

<Reaction Initiators>

In the production method of the present invention, as reaction initiators, two types of reaction initiators, namely, (ii') an aryl boron fluoride compound and (ii") a boron trifluoride compound are used. If only (ii") the boron trifluoride compound is used, it is difficult to achieve both a high-molecular-weight oxymethylene copolymer and a high yield. However, by combining (ii') the aryl boron fluoride compound that is a highly active reaction initiator with (ii") the boron trifluoride compound, the achievement of both a high-molecular-weight oxymethylene copolymer and a high yield can be realized, and further, an increase in molding odor (i.e. odor generated from a molded body) can also be suppressed. If the yield is high, raw material saving and energy saving can be realized by the improvement of production efficiency, and it becomes possible to reduce production costs.

In addition, by increasing the amount of a chain-transfer agent, it makes possible to further increase the production amount in the polymerization step, while ensuring production stability. More specifically, in general, if the production amount in the polymerization step is intended to be increased in an identical production apparatus, heat removal cannot keep up with the speed of increasing the reaction heat during the polymerization. As a result, inconvenience such as easy progression of a side reaction or hardly increasing of the polymerization degree occurs, and the MFR of the product increases, which results in a reduction in the amount of a chain-transfer agent used. At this time, if the amount of the chain-transfer agent used becomes near zero, a further increase in the production amount cannot be expected, and further, the polymerization degree of the product cannot be adjusted. In the end, the requirement that is an increase in the production amount in the polymerization step cannot be met. However, in the production method of the present invention, the use of the two types of specific reaction initiators enables an increase in the amount of the chain-transfer agent, and a further increase in the production amount can be achieved, while avoiding the problems regarding production stability, such as progression of a side reaction or hardly increasing of the polymerization degree.

Furthermore, by using (ii') the aryl boron fluoride compound and (ii") the boron trifluoride compound, together with (iii) the after-mentioned layered double hydroxide, when the oxymethylene copolymer resin composition is preserved, in particular, in a high temperature and humidity environment, and is then subjected to molding, the amount of odor generated from the obtained molded body can be effectively suppressed.

Examples of (ii') the aryl boron fluoride compound may include tris(pentafluorophenyl)borane, bis(pentafluorophenyl)fluoroborane, pentafluorophenyldifluoroborane, tris(2,3,4,5-tetrafluorophenyl)boron, tris(2,3,4,6-tetrafluorophenyl)boron, tris(2,3,5,6-tetrafluorophenyl)boron, tris(2,3,5-trifluorophenyl)boron, tris(2,4,6-trifluorophenyl)boron, tris(1,3-difluorophenyl)boron, tris(2,3,5,6-tetrafluoro-4-methylphenyl)boron, tris(2,3,4,6-tetrafluoro-5-methylphenyl)boron, tris(2,4,5-trifluoro-6-methylphenyl)boron, tris(2,3,6-trifluoro-4-methylphenyl)boron, tris(2,4,6-trifluoro-3-methylphenyl)boron, tris(2,6-difluoro-3-methylphenyl)boron, tris(2,4-difluoro-5-methylphenyl)boron, tris(3,5-difluoro-2-methylphenyl)boron, tris(4-methoxy-2,3,5,6-tetrafluorophenyl)boron, tris(3-methoxy-2,4,5,6-tetrafluorophenyl)boron, tris(2-methoxy-3,5,6-trifluorophenyl)boron, tris(3-methoxy-2,5,6-trifluorophenyl)boron, tris(3-methoxy-2,4,6-trifluorophenyl)boron, tris(2-methoxy-3,5-difluorophenyl)

boron, tris(3-methoxy-2,6-difluorophenyl)boron, tris(3-methoxy-4,6-difluorophenyl)boron, tris(2-methoxy-4,6-difluorophenyl)boron, and tris(4-methoxy-2,6-difluorophenyl) boron. These compounds may also be hydrates.

As (ii') the aryl boron fluoride compound, at least one type selected from the group consisting of tris(pentafluorophenyl)borane, bis(pentafluorophenyl)fluoroborane, pentafluorophenyldifluoroborane, and their hydrates, is preferably used.

The amount of (ii') the aryl boron fluoride compound used may be determined, as appropriate, depending on polymerization conditions, etc. The lower limit of the amount of (ii') the aryl boron fluoride compound used is preferably $1 \times 10^{-8}$ mol, more preferably $5 \times 10^{-8}$ mol, and particularly preferably $1 \times 10^{-7}$ mol, with respect to 1 mol of (i') the trioxane. On the other hand, the upper limit of the amount of (ii') the aryl boron fluoride compound used is preferably $1 \times 10^{-5}$ mol, more preferably $5 \times 10^{-6}$ mol, and particularly preferably $1 \times 10^{-6}$ mol, with respect to 1 mol of (i') the trioxane.

(ii") The boron trifluoride compound is a compound represented by the formula $BF_3 \cdot (\alpha)_m$. In the formula, m represents 0 or 1. In the formula, α represents alkyl ether containing 2 to 20 carbon atoms, tetrahydrofuran, or phenol. Preferably, a is at least one type selected from the group consisting of dimethyl ether, diethyl ether, and dibutyl ether.

The amount of (ii") the boron trifluoride compound used may be determined, as appropriate, depending on polymerization conditions, etc. The lower limit value of the amount of (ii") the boron trifluoride compound used is generally $1 \times 10^{-6}$ mol, and preferably $1 \times 10^{-5}$ mol, with respect to 1 mol of (i') the trioxane. The upper limit value thereof is generally $1 \times 10^{-3}$ mol, and preferably $1 \times 10^{-4}$ mol, with respect to 1 mol of (i') the trioxane.

The ratio between (ii') the aryl boron fluoride compound and (ii") the boron trifluoride compound may be determined, as appropriate, depending on the MFR of the oxymethylene copolymer as a final product of interest, etc. With regard to the lower limit value of the molar ratio between the above two compounds, the ratio of (ii') the aryl boron fluoride compound to (ii") the boron trifluoride compound is preferably 0.0001 or more, and particularly preferably 0.001 or more. The upper limit value thereof of the ratio of (ii') the aryl boron fluoride compound to (ii") the boron trifluoride compound is preferably less than 1, and particularly preferably 0.1 or less.

With regard to the above two types of reaction initiators, if only the two types of reaction initiators are used without the further combined use of other reaction initiators, a high polymerization degree and a high yield can be achieved, and further, when a molded body is formed from the resin composition, an increase in the amount of odor generated can also be suppressed. However, as necessary, other reaction initiators may be further used in combination with the above two types of reaction initiators.

(ii') The aryl boron fluoride compound and (ii") the boron trifluoride compound may be each added into a reaction system, separately. However, it is preferable that the two compounds have previously been mixed with each other to prepare a reaction initiator mixture, and that the reaction initiator mixture is then used in the polymerization reaction. When other reaction initiators are used in addition to (ii') the aryl boron fluoride compound and (ii") the boron trifluoride compound, the two compounds may be or may not be mixed with such other reaction initiators.

More preferably, (ii') the aryl boron fluoride compound has previously been mixed with (ii") the boron trifluoride compound to generate a reaction initiator complex, in which (ii') the aryl boron fluoride compound is coordinated to (ii") the boron trifluoride compound, and a reaction initiator mixture comprising such a reaction initiator complex is preferably used. This is because it is assumed that the Lewis acidity of (ii") the boron trifluoride compound is intensified as a result of the coordination.

<(iii) Layered Double Hydroxide>

In the production method of the present invention, (iii) a layered double hydroxide is further used. (iii) The layered double hydroxide is represented by the following formula (1):

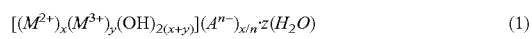

$$[(M^{2+})_x(M^{3+})_y(OH)_{2(x+y)}](A^{n-})_{x/n} \cdot z(H_2O) \qquad (1)$$

wherein $M^{2+}$ represents a divalent metal ion, $M^{3+}$ represents a trivalent metal ion, $A^{n-}$ represents an n-valent anion and may comprise a plurality of anions, x represents a range of $0 < x \le 6.0$, n represents an integer of 1 to 3, and y and z each represent a number of 0 or greater.

Examples of the divalent metal ion ($M^{2+}$) may include alkaline earth metal ions ($Mg^{2+}$, etc.), $Mn^{2+}$, $Fe^{2+}$, $Co^{2+}$, $Ni^{2+}$, $Cu^{2+}$, and $Zn^{2+}$.

Examples of the trivalent metal ion ($M^{3+}$) may include $Al^{3+}$, $Fe^{3+}$, $Cr^{3+}$, $Co^{3}$, and $In^{3+}$.

Examples of the n-valent anion ($A^{n-}$) may include $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ions, and salicylate ions.

Among others, (iii) the layered double hydroxide is preferably a hydrotalcite, wherein, in the above general formula (1), the divalent metal ion ($M^{2+}$) is an alkaline earth metal ion, the trivalent metal ion ($M^{3+}$) is $Al^{3+}$, and the n-valent anion ($A^{n-}$) is $CO_3^{2-}$ and/or $OH^-$. Further, among such hydrotalcites, particularly preferable is a compound, wherein, in the above general formula (1), the divalent metal ion ($M^{2+}$) is $Mg^{2+}$, the trivalent metal ion ($M^{3+}$) is $Al^{3+}$, and the n-valent anion ($A^{n-}$) is $CO_3^{2-}$ and/or $OH^-$.

Examples of the aforementioned hydrotalcite may include a natural hydrotalcite represented by $Mg_{1.5}Al_{0.5}(OH)_4(CO_3)_{0.75} \cdot 1.0H_2O$, and a synthetic hydrotalcite represented by $Mg_{4.5}Al_2(OH)_{13}CO_3 \cdot 1.5H_2O$. As such a hydrotalcite, a commercially available product can be used. For example, Hycite (registered trademark) 713 ($Mg_6Al_2(OH)_{16}CO_3 \cdot 1.5H_2O$), manufactured by Clariant Plastics & Coatings (Japan) K.K., can be used.

In the present invention, by using (iii) the layered double hydroxide, generation of odor such as formaldehyde from a molded body obtained using the oxymethylene copolymer resin composition can be suppressed. (iii) The layered double hydroxide is excellent, particularly, in that odor generated from a molded body obtained using the oxymethylene copolymer resin composition that has been preserved, not only in an ordinary environment, but also in a high temperature and humidity environment, can be suppressed. The reason is not known, but the present inventors assume as follows. First, the present inventors assume that one reason for odor generated from a molded body obtained using the oxymethylene copolymer resin composition is that a side reaction occurring upon the production of the resin composition influences a part of the structure of the resin, the structure is decomposed during the preservation thereof, odor is then generated due to the decomposition product during the molding, and the odor remains in the molded body. It is assumed that odor is generated from the molded body for such a reason. In the present invention, by using (iii) the layered double hydroxide, together with (ii') the aryl boron fluoride compound and (ii") the boron trifluoride compound, even if a side reaction occurs upon the production and apart of the structure is thereby changed, hydrolysis during the preservation is suppressed. As a result, it is assumed that odor generation from the molded body is suppressed. Furthermore, even if hydrolysis progresses, since (iii) the layered double hydroxide detoxifies acid, odor generation due to acidic components generated when hydrolysis progresses can also be suppressed.

The additive amount of (iii) the layered double hydroxide is set to be 0.003 to 1 parts by mass, based on 100 parts by mass of (i) the oxymethylene copolymer. Preferably, the additive amount of (iii) the layered double hydroxide is set to be 0.003 to 0.6 parts by mass, 0.004 to 0.6 parts by mass, or 0.005 to 0.5 parts by mass. More preferably, the additive amount of (iii) the layered double hydroxide is set to be 0.005 to 0.2 parts by mass, and particularly preferably, it is set to be 0.01 to 0.2 parts by mass. By setting the additive amount of (iii) the layered double hydroxide within the above-described range, odor generation can be effectively suppressed.

In the production method of the present invention, in addition to the above-described (i') trioxane, (i") comonomer, (ii') aryl boron fluoride compound, (ii") boron trifluoride compound, and (iii) layered double hydroxide, other materials can be further used.

<(iv) Hindered Phenolic Antioxidant>

As another material, (iv) a hindered phenolic antioxidant can be preferably used. The hindered phenolic antioxidant is not particularly limited, as long as it is a hindered phenol compound having an antioxidant action to the oxymethylene copolymer. Examples of the hindered phenolic antioxidant may include 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyldimethylamine, distearyl-3,5-di-t-butyl-4-hydroxybenzyl phosphonate, diethyl-3,5-di-t-butyl-4-hydroxybenzyl phosphonate, 2,6,7-trioxa-1-phosphabicyclo[2.2.2]oct-4-yl-methyl-3,5-di-t-butyl-4-hydroxyhydrocinnamate, 3,5-di-t-butyl-4-hydroxyphenyl-3,5-distearyl-thiotriazylamine, 2-(2-hydroxy-3,5-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocinnamide), octadecyl-3-(3,5-di-t-butyl-4-hydroxyphenyl)propionate, 1,6-hexanediol-bis[3-(3,5-di-t-butyl-4-hydroxyphenyl)propionate], pentaerythritol-tetrakis [3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-4-hydroxy-5-methylphenyl)propionate], triethylene glycol-bis[3-(3,5-di-t-butyl-4-hydroxyphenyl)propionate], and 2,2'-thiodiethyl-bis[3-(3,5-di-t-butyl-4-hydroxyphenyl)propionate]. These hindered phenol compounds may be used alone as a single type, or may also be used in combination of two or more types. Among these compounds, 1,3,5-trimethyl-2,4,6-tris(3,5-di-t-butyl-4-hydroxybenzyl)benzene, pentaerythritol-tetrakis [3-(3,5-di-t-butyl-4-hydroxyphenyl)propionate], and triethylene glycol-bis[3-(3-t-butyl-4-hydroxy-5-methylphenyl) propionate] are preferable, and triethylene glycol-bis[3-(3-t-butyl-4-hydroxy-5-methylphenyl)propionate] is particularly preferable.

By the use of (iv) the hindered phenolic antioxidant, the viscosity of the oxymethylene copolymer can be maintained, and a reduction in the molecular weight can be easily suppressed.

The additive amount of (iv) the hindered phenolic antioxidant may be determined, as appropriate, depending on the types or amounts of other materials, etc. The additive amount of (iv) the hindered phenolic antioxidant is preferably 0.01 to 1 part by mass, more preferably 0.01 to 0.5 parts by mass, and particularly preferably 0.05 to 0.5 parts by mass, based on 100 parts by mass of (i) the oxymethylene copolymer. When the amount of (iv) the hindered phenolic antioxidant used is too small, it is likely that the oxidative decomposition of the oxymethylene copolymer occurs, and that odor is easily generated not only during the production, but also from a molded body. On the other hand, when the amount of (iv) the hindered phenolic antioxidant used is too large, it is likely that mold contamination occurs.

<(v) Nitrogen-Containing Compound>

In addition, in the production method of the present invention, it is preferable to use (v) a nitrogen-containing compound as another material. By using (v) the nitrogen-containing compound, odor generated from a molded body, in particular, odor generated from a molded body obtained using a resin composition that has been preserved in a high temperature and humidity environment can be effectively suppressed.

(v) The nitrogen-containing compound is not particularly limited. Examples of (v) the nitrogen-containing compound may include an amino-substituted triazine compound, a polyamide resin, a hindered amine compound, and a dicarboxylic acid hydrazide. Among these compounds, at least one type selected from the group consisting of an amino-substituted triazine compound, a polyamide resin, and a hindered amine compound is preferable, and an amino-substituted triazine compound is particularly preferable. Moreover, these nitrogen-containing compounds may be used alone as a single type, or may also be used in combination of two or more types.

The amino-substituted triazine compound is not particularly limited. Examples of the amino-substituted triazine compound may include guanamine, melamine, N-butylmelamine, N-phenylmelamine, N,N-diphenylmelamine, N,N-diallylmelamine, N,N',N"-triphenylmelamine, methylolmelamine such as N,N',N"-trimethylolmelamine, alkylated melamines such as hexamethoxymethylmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, and amelin (N,N,N',N"-tetracyanoethylbenzoguanamine). Among others, melamine, methylolmelamine, alkylated melamine, benzoguanamine, and a water-soluble melamine-formaldehyde resin are preferable. The above-described amino-substituted triazine compounds may be used alone as a single type, or may also be used in combination of two or more types. These amino-substituted triazine compounds are used as heat stabilizers.

The polyamide resin is not particularly limited, as long as it is a resin having two or more amide bonds in a molecule thereof. Examples of the polyamide resin may include nylon-6, nylon-6,6, nylon-6,10, a ternary copolymer thereof, a polymerized fatty acid polyamide resin, and a polyamide elastomer. Among these, a polymerized fatty acid polyamide resin or a polyamide elastomer is particularly preferable. These polyamide resins may be used alone as a single type, or may also be used in combination of two or more types.

Herein, the "polymerized fatty acid polyamide resin" means a polyamide resin composed of a polycondensate of polymerized fatty acid and diamine.

The polymerized fatty acid is an unsaturated fatty acid polymer, or a product obtained by hydrogenation of this polymer. Examples of the polymerized fatty acid may include a dimer of monobasic fatty acid containing 10 to 24 carbon atoms and having one or more double bonds or triple bonds (dimer acid), and a hydrogenation product thereof. Examples of the dimer acid may include dimers of oleic acid, linoleic acid, erucic acid, and the like.

Examples of the diamine may include hexamethylenediamine, heptamethylenediamine, octamethylenediamine, decamethylenediamine, and m-xylylenediamine.

The polyamide elastomer means a polyamide resin having a hard segment and a soft segment, in which the hard segment is composed of polyamide and the soft segment is composed of a polymer other than the polyamide. Examples of the polyamide that constitutes the hard segment may include nylon-6, nylon-6,6, nylon-6,10, a ternary copolymer thereof, and a polymerized fatty acid polyamide resin. Examples of the polymer other than the polyamide may include aliphatic polyester and aliphatic polyether. Examples of the aliphatic polyester may include poly(s-caprolactone), polyethylene adipate, polybutylene adipate, and polybutylene succinate. Examples of the aliphatic polyether may include polyalkylene glycol such as polyethylene oxide and polypropylene oxide.

The hindered amine compound is not particularly limited. Examples of the hindered amine compound may include a polycondensate of N,N',N",N'"-tetrakis-(4,6-bis-(butyl-(N-methyl-2,2,6,6-tetramethylpiperidin-4-yl)amino)-triazin-2-yl)-4,7-diazadecane-1,10-diamine, dibutylamine-1,3,5-triazine-N,N'-bis(2,2,6,6-tetramethyl-4-piperidyl-1,6-hexamethylenediamine and N-(2,2,6,6-tetramethyl-4-piperidyl)butylamine (BASF, Chimassorb (registered trademark) 2020 FDL); poly[{6-(1,1,3,3-tetramethylbutyl)amino-1,3,5-triazine-2,4-diyl}{(2,2,6,6-tetramethyl-4-piperidyl}imino)hexamethylene{(2,2,6,6-tetramethyl-4-piperidyl)imino}]; a polycondensate of dimethyl succinate and 4-hydroxy-2,2,6,6-tetramethyl-1-piperidineethanol (BASF, Tinuvin (registered trademark) 622SF); bis(1,2,2,6,6-pentamethyl-4-piperidyl) [[3,5-bis(1,1-dimethylethyl)-4-hydroxyphenyl]methyl]butyl malonate; bis(2,2,6,6-tetramethyl-4-piperidyl) sebacate; bis(1,2,2,6,6-pentamethyl-4-piperidyl) sebacate; and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. Among others, bis(2,2,6,6-tetramethyl-4-piperidyl) sebacate, bis(1,2,2,6,6-pentamethyl-4-piperidyl) sebacate, and a polycondensate of dimethyl succinate and 4-hydroxy-2,2,6,6-tetramethyl-1-piperidineethanol are preferable. The above-described hindered amine compounds may be used alone as a single type, or may also be used in combination of two or more types. These hindered amine compounds are used as light stabilizers or antioxidants.

The additive amount of (v) the nitrogen-containing compound may be determined, as appropriate, depending on the types or amounts of other materials, etc. The additive amount of (v) the nitrogen-containing compound is preferably 0.01 to 0.3 parts by mass, more preferably 0.01 part by mass or more and less than 0.3 parts by mass, and particularly preferably 0.01 to 0.1 part by mass, based on 100 parts by mass of (i) the oxymethylene copolymer. When the amount of (v) the nitrogen-containing compound used is too small, a reduction in the viscosity is likely to occur, or it is likely that odor, in particular, odor generated due to preservation in a high temperature and humidity environment is easily generated. On the other hand, when (v) the nitrogen-containing compound is excessively used, it is likely that odor generated from a molded body, in particular, odor generated from a molded body obtained by performing molding after preservation in a high temperature and humidity environment is easily generated.

<Chain-Transfer Agent>

In the production method of the present invention, from the viewpoint of adjusting the degree of polymerization, a chain-transfer agent (also referred to as a "molecular weight modifier") may be used as another material. The type of the chain-transfer agent is not particularly limited. Examples of the chain-transfer agent may include carboxylic acid, carboxylic acid anhydride, ester, amide, imide, phenols, and an acetal compound. In particular, phenol, 2,6-dimethylphenol, methylal, polyacetal dimethoxide, methoxymethylal, dimethoxymethylal, trimethoxymethylal, oxymethylene di-n-butyl ether are preferably used. Among others, methylal is most preferable. The chain-transfer agent can be used by being diluted with a solvent that is inactive for a polymerization reaction, as necessary.

The additive amount of the chain-transfer agent may be determined, as appropriate, depending on desired MFR. In general, the additive amount of the chain-transfer agent is adjusted in the range of 0.5% by mass or less, and preferably 0.3% by mass or less, with respect to (i') the trioxane in the polymerization raw materials. The lower limit value of the additive amount is not particularly limited, and it is adequate if the lower limit value is more than 0% by mass. Besides, the chain-transfer agent may not be necessarily used, and when the chain-transfer agent is not used, the additive amount thereof naturally becomes 0% by mass.

When the chain-transfer agent is used by being diluted with a solvent inactive for a polymerization reaction, examples of the solvent used herein may include: aliphatic hydrocarbons such as hexane, heptane, and cyclohexane; aromatic hydrocarbons such as benzene, toluene, and xylene; halogenated hydrocarbons such as methylene dichloride and ethylene dichloride; carboxylic acid esters such as methyl formate, ethyl formate, and methyl acetate; low-molecular-weight ketones such as acetone, 2-butanone, 2-pentanone, and 3-pentanone; and ethers such as 1,2-dimethoxyethane, diethylene glycol dimethyl ether, 1,4-dioxane, and n-butyl ether. Among others, although such a solvent is not essential for the production method of the present invention, from the viewpoint of removing the solvent from the generated oxymethylene copolymer, a solvent whose boiling point at one atmosphere is 115° C. or lower is preferable.

In the production method of the present invention, by increasing the amount of the chain-transfer agent, it is possible to further increase the production amount, while ensuring production stability in the polymerization step. Specifically, in the production method of the present invention, it is possible to increase the amount of the chain-transfer agent by 10% to 40% by mass, compared with the case of producing an oxymethylene copolymer under the same conditions with the exception that (ii') the aryl boron fluoride compound and (ii") the boron trifluoride compound are not used as reaction initiators.

Besides, if the amount of the chain-transfer agent exceeds the usable amount, a phenomenon, in which the MFR of the obtained oxymethylene copolymer becomes a value greater than the desired value, occurs. Thus, by confirming the presence or absence of this phenomenon, the upper limit of the usable amount of the chain-transfer agent can be determined. For example, the amount of the chain-transfer agent used at the time point, in which MFR has become a value that is greater than 120% of the desired value, can be determined to be the upper limit of the usable amount. Likewise, if the amount of the chain-transfer agent falls below the usable amount, a phenomenon, in which the MFR of the obtained oxymethylene copolymer becomes a value smaller than the desired value, occurs. Thus, by confirming the presence or absence of this phenomenon, the lower limit of the usable amount of the chain-transfer agent can be determined. For example, the amount of the chain-transfer agent used at the time point, in which MFR has become a value that is smaller than 80% of the desired value, can be determined to be the lower limit of the usable amount.

<Polymerization Reaction>

In the production method of the present invention, a polymerization reaction is carried out using (i') the trioxane, (i") the comonomer, and the reaction initiators {(ii') the aryl boron fluoride compound and (ii") the boron trifluoride compound}. The form of the polymerization reaction is not particularly limited, and the polymerization reaction can be carried out in the same form as the conventionally known method for producing an oxymethylene copolymer. Preferably, the form of the polymerization reaction may be any one of bulk polymerization, suspension polymerization, solution polymerization and melt polymerization, and bulk polymerization is particularly preferable.

Bulk polymerization is a polymerization method, in which a molten-state monomer is used and a solvent is not substantially used. In the bulk polymerization, as polymerization progresses, a polymer is crystallized in a monomer mixed solution, and then, the system as a whole is agglomerated and powdered, so that a solid-state polymer can be obtained. The polymerization is carried out in the absence of oxygen, and preferably, in a nitrogen atmosphere.

The polymerization apparatus used in the polymerization reaction is not particularly limited. For example, in the case of the bulk polymerization, in the batch-type production system, a reaction tank equipped with a stirrer that is generally used in the production of an oxymethylene copolymer can be used. On the other hand, in the continuous-type production system, previously proposed continuous polymerization devices for trioxane and the like, such as a ko-kneader, a twin-screw continuous extrusion mixer, and a twin-screw paddle-type continuous mixer, can be used. A plurality of polymerization apparatuses can also be used in combination.

Moreover, the method of supplying or adding the raw materials used in the polymerization reaction, such as (i') the trioxane, (i") the comonomer, and the reaction initiators, to the polymerization device, is not particularly limited. The aforementioned raw materials may be allowed to converge at the inlet of the polymerization apparatus, and the obtained mixture may be then introduced into the polymerization apparatus, so that the polymerization reaction may be promoted. Otherwise, some raw materials have previously been mixed with one another, and thereafter, the obtained mixture and the remaining raw materials may be converged at the inlet of the polymerization apparatus, and the thus obtained mixture may be then introduced into the polymerization apparatus, so that the polymerization reaction may be promoted. A method which comprises fully mixing a part or the total amount of raw materials, while previously keeping a liquid phase state, then supplying the obtained raw material mixed solution to the polymerization device, then further supplying the remaining raw materials thereto, if some materials remain, and then performing a polymerization reaction, is preferable because the amount of the reaction initiators necessary for the polymerization reaction can be reduced, and as a result, the amount of odor, such as formaldehyde, generated from oxymethylene copolymer products can be reduced.

It is preferable to previously mix (ii') the aryl boron fluoride compound with (ii") the boron trifluoride compound, and then to use them in the state of a reaction initiator mixture.

The reaction initiators may be directly added to the reaction system. However, the reaction initiators are preferably diluted with an organic solvent that does not affect the polymerization reaction and are then added to the reaction system, so that the reaction initiators can be homogeneously dispersed in the reaction system. When the reaction initiators are diluted with a solvent that is inactive for the polymerization reaction and are then used, examples of the solvent used may include: aliphatic hydrocarbons such as hexane, heptane, and cyclohexane; aromatic hydrocarbons such as benzene, toluene, and xylene; halogenated hydrocarbons such as methylene dichloride and ethylene dichloride; carboxylic acid esters such as methyl formate, ethyl formate, and methyl acetate; low-molecular-weight ketones such as acetone, 2-butanone, 2-pentanone, and 3-pentanone; and ethers such as 1,2-dimethoxyethane, diethylene glycol dimethyl ether, 1,4-dioxane, and n-butyl ether. Among others, although such a solvent is not essential for the production method of the present invention, from the viewpoint of removing the solvent from the generated oxymethylene copolymer, a solvent whose boiling point at one atmosphere is 115° C. or lower is preferable.

The temperature applied in the polymerization reaction is not particularly limited, and it is generally 60° C. to 120° C. The pressure applied in the polymerization reaction is not particularly limited. When the atmospheric pressure is set to be 100 kPa, the applied pressure is preferably in the range of 99.0 to 101.00 kPa at an absolute pressure. The time required for the polymerization reaction (i.e. the retention time in the polymerization device) is not particularly limited, and it is generally 2 to 30 minutes. When stirring is carried out during the polymerization reaction, the rotation speed of an impeller may be determined, as appropriate, and it is preferably 10 to 100 rpm, and particularly preferably 20 to 60 rpm.

A reaction product is obtained by the polymerization reaction. The reaction product is in a state before the removal of unreacted raw materials, etc. That is to say, the reaction product comprises (i) the oxymethylene copolymer, unreacted raw materials, etc. In the production method of the present invention, the content rate of (i) the oxymethylene copolymer in the reaction product (hereinafter also referred to as a "POM content rate") tends to be high, and the POM content rate is preferably higher than 92%, more preferably 93.5% or more, and particularly preferably 95% or more. The upper limit of the POM content rate is not particularly limited, and it is 100% by mass or less. In order to adjust the POM content rate in the reaction product to the aforementioned value, the polymerization conditions are preferably controlled. A high POM content rate in the reaction product means that the amount of unreacted monomers is small, and that the polymerization reaction has sufficiently progressed. Therefore, by increasing the POM content rate in the reaction product, it becomes possible to reduce energy consumption for the recovery of unreacted raw materials.

The POM content rate in the reaction product is measured by the following method. Specifically, a part of the reaction product obtained by the polymerization reaction is recovered, and the weight thereof (hereinafter referred to as "A g") is then measured. Subsequently, in order to remove unreacted monomers, the reaction product is washed with acetone twice, and the acetone and the remaining unreacted monomers are then vacuum-dried in a vacuum dryer at 60°

C. for 2 hours. After completion of the vacuum drying, the weight (B g) is measured. The obtained value is introduced into the following equation to calculate the POM content rate in the reaction product.

POM content rate (% by weight)=$B(g)/A(g)\times 100$

<Termination of Polymerization Reaction>

After the polymerization reaction has sufficiently progressed, a known terminator may be mixed into the reaction system to inactivate the reaction initiators and polymerization growth ends, so that the polymerization reaction may be terminated. Examples of known terminators may include: trivalent organic phosphorus compounds such as triphenylphosphine; hydroxides of alkali metals; hydroxides of alkaline-earth metals; and amine compounds such as diethylamine, triethylamine, tributylamine, triethanolamine, N-methyldiethanolamine, N,N-diethylhydroxylamine, N-isopropylhydroxylamine, N,N-bisoctadecylhydroxylamine, and N,N-dibenzylhydroxylamine. Among these compounds, N,N-diethylhydroxylamine is particularly preferable because N,N-diethylhydroxylamine has excellent properties such that the amount of formaldehyde generated from the product is reduced and generation of mold deposit is small during the molding, and also because N,N-diethylhydroxylamine is easily available.

The additive amount of the terminator is not particularly limited, as long as it is an amount sufficient for inactivating the reaction initiators. The terminator is generally used in the range of $1.0\times 10^{-1}$ to $1.0\times 10^{1}$ at a molar ratio to the reaction initiators.

When the terminator is used in the form of a solution or a suspension, the solvent used is not particularly limited. Examples of the solvent that can be used herein may include: water; alcohols; and various types of aliphatic and aromatic organic solvents, such as acetone, methyl ethyl ketone, hexane, cyclohexane, heptane, benzene, toluene, xylene, methylene dichloride, and ethylene dichloride.

The apparatus for adding and mixing the terminator and the timing of adding the terminator are not particularly limited. For example, a method of using a mixing machine having the same specification as that of the aforementioned polymerization apparatus, wherein the mixing machine is connected in series with the polymerization apparatus, and adding and blending the terminator to the inlet of the mixing machine, is applied. The temperature applied during the addition and blending of the terminator is not particularly limited, and it is preferably 0° C. to 160° C., and particularly preferably 0° C. to 120° C. In addition, the pressure is not particularly limited. When the atmospheric pressure is set to be 100 kPa, the pressure applied herein is preferably in the range of 99.0 to 101.0 kPa at an absolute pressure. The time required for mixing after addition (i.e. the retention time in the mixing machine) is not particularly limited, and it is preferably 1 to 150 minutes, and particularly preferably 1 to 120 minutes.

The polymerization reaction has sufficiently progressed, and a polymerization termination step that is performed as necessary has been completed, so that a reaction product can be obtained.

<Stabilization>

After the polymerization reaction has sufficiently progressed, the polymerization termination step performed as necessary has been completed, and a reaction product has been obtained, the reaction product discharged from the polymerization apparatus is blended with a known stabilizer, as necessary, and the obtained mixture is then subjected to heat-melt kneading, using a monoaxial or biaxial extruder, a biaxial paddle-type continuous mixing machine, etc. Thereby, a thermally instable portion can be thermally decomposed, and deaeration can be carried out under reduced pressure. These operations are referred to as "stabilization."

After the reaction product has been discharged from the polymerization apparatus, it may be pulverized, as necessary, using Turbomill or the like, before the heat-melt kneading (before blending, when the blending is carried out).

When the reaction product is blended with a stabilizer, the blending may be carried out by a known method, and for example, melt kneading may be carried out, using the aforementioned mixing machine connected in series with the polymerization apparatus, by which the product has been mixed with the terminator. The apparatus used to perform melt kneading preferably has a vent function, and examples of such an apparatus may include a monoaxial or multiaxial continuous extrusion kneader and a biaxial surface renewal-type horizontal kneader, both of which have at least one vent hole. These apparatuses may be used each alone, or may also be used in combination of two or more apparatuses.

When the reaction product has not previously been blended with the stabilizer, the stabilizer may be continuously supplied to the line of the reaction product. Otherwise, the reaction product and the stabilizer may be supplied to a biaxial extruder through different lines, and may be then subjected to heat-melt kneading in the biaxial extruder.

In the production method of the present invention, in this stabilization step, (iii) a layered double hydroxide is used, instead of or together with the above-described stabilizer. As with the stabilizer, (iii) the layered double hydroxide may be blended with the reaction product, and may be then subjected to heat-melt kneading, or (iii) the layered double hydroxide may be continuously supplied to the line of the reaction product. Otherwise, (iii) the layered double hydroxide may be continuously supplied to the biaxial extruder through another line that is different from the line of the reaction product. (iii) The layered double hydroxide may be added simultaneously with at least one of a known stabilizer, and (iv) a hindered phenolic antioxidant, (v) a nitrogen-containing compound, and a known additive, as mentioned below, or may also be added separately therefrom.

In the production method of the present invention, when (iv) the hindered phenolic antioxidant or (v) the nitrogen-containing compound is used, it is preferable to use (iv) the hindered phenolic antioxidant or (v) the nitrogen-containing compound, instead of or together with the above-described stabilizer in the present step. As with the stabilizer, (iv) the hindered phenolic antioxidant or (v) the nitrogen-containing compound may be blended with the reaction product, and may be then subjected to heat-melt kneading. Otherwise, (iv) the hindered phenolic antioxidant or (v) the nitrogen-containing compound may be continuously supplied to the line of the reaction product, or (iv) the hindered phenolic antioxidant or (v) the nitrogen-containing compound may be continuously supplied to the biaxial extruder through another line that is different from that of the reaction product. (iv) The hindered phenolic antioxidant or (v) the nitrogen-containing compound may be added simultaneously with at least one of a known stabilizer, (iii) the layered double hydroxide, and the after-mentioned known additive, or may also be added separately therefrom.

Examples of the known stabilizer used in the present step may include: antioxidants other than the hindered phenolic antioxidant; formaldehyde scavengers; and acid scavengers. The known stabilizer may be added simultaneously with at least one of (iii) the layered double hydroxide, (iv) the hindered phenolic antioxidant, (v) the nitrogen-containing compound, and a known additive, or may also be added separately therefrom.

Moreover, in the present step, a known additive may be used. Examples of the known additive may include: inorganic fillers such as glass fiber; crystallization accelerators (nuclear agents); mold release agents; sliding agents; and coloring agents. The known additive may be added simultaneously with at least one of a known stabilizer, (iii) the layered double hydroxide, (iv) the hindered phenolic antioxidant, and (v) the nitrogen-containing compound, or may also be added separately therefrom.

The temperature, at which the melt kneading is performed, is not particularly limited, as long as it is the melting point or higher of the product obtained by the polymerization reaction. The temperature is preferably in the temperature range of 170° C. or higher and 270° C. or lower, and more preferably 190° C. or higher and 250° C. or lower. If the temperature of the melt kneading is 270° C. or lower, the product and the oxymethylene copolymer obtained by the melt kneading are hardly decomposed and deteriorated during the melt kneading.

The pressure applied upon the melt kneading is not particularly limited. In order to remove unreacted raw materials such as a cyclic oligomer, a formaldehyde component derived from the cyclic oligomer, and hemiformal end-derived formaldehyde, the melt kneading is preferably carried out under reduced pressure, together with a devolatilization treatment. Such vacuum devolatilization is carried out from the aforementioned vent hole. Accordingly, when the atmospheric pressure is set to be 100 kPa, the pressure applied in the melt kneading is preferably in the range of 10 to 100 kPa, more preferably in the range of 10 to 70 kPa, and particularly preferably in the range of 10 to 50 kPa, at an absolute pressure. The rotation speed of an impeller during the melt kneading is preferably 50 to 200 rpm in the case of a biaxial extruder. In the case of a biaxial surface renewal-type horizontal kneader, the rotation speed of the impeller is preferably 1 to 100 rpm.

The time required for the melt kneading (i.e. the retention time in the melt kneading apparatus) is not particularly limited, and it is preferably 1 to 60 minutes, and particularly preferably 1 to 40 minutes.

Thus, an oxymethylene copolymer resin composition is obtained as a product of interest.

The aforementioned production process is one example. Thus, addition or omission of steps may be carried out, as appropriate, and the content of each step may be modified. For example, after termination of the polymerization reaction and before stabilization, the reaction product may be subjected to pulverization, washing, separation and recovery of unreacted monomers, drying, and the like, as necessary. Moreover, when purification needs to be carried out, washing, separation and recovery of unreacted monomers, drying, and the like may be carried out after stabilization. Furthermore, after completion of the stabilization step, pellets obtained by pelletizing may be subjected to melt kneading again.

Further, materials, such as known additives, may also be used in addition to the above-described materials, in a range in which the materials do not impair the object of the present invention. Still further, the above-described materials may be used in a step that is different from the above-described steps, in a range in which the materials do not impair the object of the present invention.

<Oxymethylene Copolymer Resin Composition>

Another aspect of the present invention relates to an oxymethylene copolymer resin composition comprising (i) an oxymethylene copolymer, (ii) a derivative of an aryl boron fluoride compound, and (iii) a layered double hydroxide (hereinafter also referred to as "the oxymethylene copolymer resin composition of the present invention").

The oxymethylene copolymer resin composition of the present invention can be produced using (ii') an aryl boron fluoride compound, (ii") a boron trifluoride compound, and (iii) a layered double hydroxide, according to any given method, preferably, according to the production method of the present invention. In addition, preferably, the oxymethylene copolymer resin composition of the present invention can be produced using a reaction initiator mixture obtained by previously mixing (ii') the aryl boron fluoride compound and (ii") the boron trifluoride compound, and (iii) the layered double hydroxide; and more preferably, the oxymethylene copolymer resin composition of the present invention can be produced using a reaction initiator mixture obtained by previously mixing (ii') the aryl boron fluoride compound with (ii") the boron trifluoride compound, and (iii) the layered double hydroxide, according to the production method of the present invention.

Details, such as the definitions, types, and mixing purposes of (ii') the aryl boron fluoride compound, (ii") the boron trifluoride compound, and (iii) the layered double hydroxide, are as described in the explanation regarding the production method of the present invention.

(i) Oxymethylene Copolymer (i) The oxymethylene copolymer is a high-molecular-weight compound comprising, as constitutional units, an oxymethylene unit ($-OCH_2-$) and an oxyalkylene unit containing 2 or more carbon atoms. The oxyalkylene group containing 2 or more carbon atoms is not particularly limited, and examples of the oxyalkylene group containing 2 or more carbon atoms may include an oxyethylene ($-OCH_2CH_2-$) group, an oxypropylene ($-OCH_2CH_2CH_2-$) group, and an oxybutylene ($-OCH_2CH_2CH_2CH_2-$) group. Among these groups, the oxyethylene group ($-OCH_2CH_2-$) is preferable.

The content of the oxyalkylene group containing 2 or more carbon atoms in (i) the oxymethylene copolymer is not particularly limited. The content of the oxyalkylene group is preferably 0.4 moles or more and 15 moles or less, more preferably 0.4 moles or more and 10 moles or less, and particularly preferably 0.4 moles or more and 5.0 moles or less, with respect to the total 100 moles of the molar amount of the oxymethylene group and the molar amount of the oxyalkylene group.

The content of the oxyalkylene group containing 2 or more carbon atoms in (i) the oxymethylene copolymer can be measured according to 1H-NMR, as described in the after-mentioned Examples.

(ii) Derivative of Aryl Boron Fluoride Compound

In the oxymethylene copolymer resin composition of the present invention, (ii') the aryl boron fluoride compound is comprised in a state in which the compound forms a derivative with another component.

For example, when the oxymethylene copolymer resin composition of the present invention is produced using (ii') the aryl boron fluoride compound and another material containing fluorine, the oxymethylene copolymer resin composition of the present invention comprises, as a derivative of (ii) the aryl boron fluoride compound, a fluorine adduct of the aryl boron fluoride compound.

Preferably by producing the oxymethylene copolymer resin composition of the present invention using a reaction initiator mixture obtained by previously mixing (ii') the aryl boron fluoride compound and (ii") the boron trifluoride compound, the oxymethylene copolymer resin composition of the present invention comprises fluorine adducts of (ii') the aryl boron fluoride compound and an aryl boron fluoride compound derived from (ii") the boron trifluoride compound. In this case, from the viewpoints of achieving both a high-molecular-weight resin composition and a high yield in the production process, and also suppressing an increase in molding odor (i.e. odor generated from a molded body), the molar ratio B1/B2 of the amount of boron (B1) derived from (ii') the aryl boron fluoride compound to the amount of boron (B2) derived from (ii") the boron trifluoride compound is preferably 0.0001 to 0.1.

The amount of boron (B2) derived from (ii") the boron trifluoride compound and the amount of boron (B1) derived from (ii') the aryl boron fluoride compound can be measured by the method described in the after-mentioned Examples. That is to say, the amount of boron (B1) derived from (ii') the aryl boron fluoride compound can be obtained by measuring the content of the derivative of the aryl boron fluoride compound according to LC-MS analysis and then calculating the amount of boron. On the other hand, the amount of boron (B2) derived from (ii") the boron trifluoride compound can be obtained by measuring the total boron amount (B3) in the oxymethylene copolymer resin composition of the present invention using an ICP emission spectrophotometric analyzer, and then obtaining the amount from the difference between the total boron amount (B3) and the amount of boron (B1) derived from the aryl boron fluoride compound.

In the oxymethylene copolymer resin composition of the present invention, the aryl boron fluoride compound is preferably at least one type selected from the group consisting of tris(pentafluorophenyl)borane, bis(pentafluorophenyl)fluoroborane, pentafluorophenyldifluoroborane, and their hydrates.

(iii) Layered Double Hydroxide

In the oxymethylene copolymer resin composition of the present invention, (iii) the layered double hydroxide is preferably a hydrotalcite, and is more preferably a hydrotalcite wherein, in the above-described general formula (1), $M^{2+}$ is $Mg^{2+}$, $M^{3+}$ is $Al^{3+}$, and $A^{n-}$ is $CO_3^{2-}$ and/or $OH^-$.

From the viewpoint of effectively suppressing generation of odor from a molded body, the content of (iii) the layered double hydroxide in the oxymethylene copolymer resin composition of the present invention is preferably 0.003 to 1 parts by mass, based on 100 parts by mass of (i) the oxymethylene copolymer. The content of (iii) the layered double hydroxide in the present oxymethylene copolymer resin composition is more preferably 0.003 to 0.6 parts by mass, 0.004 to 0.6 parts by mass, or 0.005 to 0.5 parts by mass. The content of (iii) the layered double hydroxide is further preferably 0.005 to 0.2 parts by mass, and particularly preferably 0.01 to 0.2 parts by mass.

Other Components

The oxymethylene copolymer resin composition of the present invention may comprise other components, in addition to (i) the oxymethylene copolymer, (ii) the derivative of the aryl boron fluoride compound, and (iii) the layered double hydroxide. Examples of such other components may include other materials described in the explanation for the production method of the present invention and components derived from such other materials.

For example, the oxymethylene copolymer resin composition of the present invention may comprise (iv) a hindered phenolic antioxidant. Details, such as the type of (iv) the hindered phenolic antioxidant and the purpose of mixing the hindered phenolic antioxidant, are as described in the section <(iv) Hindered phenolic antioxidant> in the production method of the present invention. The content of (iv) the hindered phenolic antioxidant in the oxymethylene copolymer resin composition of the present invention is preferably 0.01 to 1 part by mass, and more preferably 0.01 to 0.5 parts by mass, based on 100 parts by mass of (i) the oxymethylene copolymer.

Moreover, the oxymethylene copolymer resin composition of the present invention preferably comprises (v) a nitrogen-containing compound. Details, such as the type of (v) the nitrogen-containing compound and the purpose of mixing the nitrogen-containing compound, are as described in the section <(v) Nitrogen-containing compound > in the production method of the present invention.

(v) The nitrogen-containing compound is preferably at least one type selected from the group consisting of an amino-substituted triazine compound, a polyamide resin, and a hindered amine compound.

The content of (v) the nitrogen-containing compound in the oxymethylene copolymer resin composition of the present invention is preferably 0.01 to 0.3 parts by mass, based on 100 parts by mass of (i) the oxymethylene copolymer. The content of (v) the nitrogen-containing compound is more preferably 0.01 part by mass or more and less than 0.3 parts by mass, and particularly preferably 0.01 to 0.1 part by mass.

<Intended Use>

The oxymethylene copolymer resin composition of the present invention can be molded into various forms according to a known molding process method for oxymethylene copolymer resin compositions. From a molded body obtained from the oxymethylene copolymer resin composition of the present invention, odor generation is suppressed. Examples of such a molded body obtained from the oxymethylene copolymer resin composition of the present invention may include a pellet, a round bar, a plank, a sheet, a tube, and a cylindrical or square vessel, but the examples are not limited thereto.

The oxymethylene copolymer resin composition of the present invention and a molded body thereof can be used as various types of parts of machinery, electricity, automobiles, building materials, and the like. For example, the oxymethylene copolymer resin composition of the present invention and a molded body thereof can be used for automotive parts, clothing parts, molded parts for electrical and electronic use and molded parts for information recording equipment, molded parts for medical equipment, household molded parts, rotating parts such as gears, bearing members, sliding members, press-fit parts, hinge parts, automobile fuel-surrounding parts, insert parts, snap-fit parts, water parts, various handles, various handrails, various chassis, side plate parts, spring parts, seat belt parts, car carrier plates, car combination switches, clips, pipe holders, wire holders, connectors, assist clips, storage materials for bumpers, console boxes, door trims, door checkers, ball joints, undercut parts, storage cases for optical fiber core connection, disc cartridges, tape cassettes, disc-shaped recording medium trays, toners, film holders, protective covers, artificial joints, medical treatment tool insertion valves, blood vessel insertion tools, caps, compact containers, fastener parts, card cases, toothbrushes, eating and drinking utensils, curtain rails with covers, curtain rail caps, liquid container lids, writing utensils, folding storage frames, baskets and the handles thereof, etc.

EXAMPLES

Hereinafter, the present invention will be more specifically described in the following examples. However, these examples are not intended to limit the scope of the present invention.

Example 1

Polymerization Reaction

Trioxane was jointed with 1,3-dioxolane to obtain a mixed fluid. At this time, trioxane was jointed at a rate of 200 kg/hr, whereas 1,3-dioxolane as a comonomer was jointed at a rate of 8.0 kg/hr. Subsequently, methylal (a benzene solution having a methylal concentration of 33% by mass) serving as a chain-transfer agent was jointed with the mixed fluid, while the amount of methylal was adjusted to result in a MFR value of 8 g/10 min. Finally, a reaction initiator mixture obtained by previously mixing reaction initiators, namely, boron trifluoride diethyl etherate ($BF_3$) and tris(pentafluorophenyl)borane trihydrate (TPB) in the amounts shown in Table 1, was continuously jointed with the aforementioned substances, so as to obtain a mixture. Immediately after obtaining the mixture, the obtained mixture was supplied to a biaxial continuous polymerization apparatus equipped with a self-cleaning-type paddle, the temperature of which had been set to be 85° C.

A polymerization reaction was continuously carried out, such that the retention time in the continuous polymerization apparatus became 15 minutes.

Termination of Polymerization Reaction

When the retention time became 15 minutes, N,N-diethylhydroxylamine (a benzene solution having an N,N-diethylhydroxylamine concentration of 20% by weight) serving as a polymerization terminator was added into the continuous polymerization apparatus. The additive amount of N,N-diethylhydroxylamine was 4 mol, with respect to 1 mol of the reaction initiators ($BF_3$ and TPB). After addition of N,N-diethylhydroxylamine, pulverization was carried out.

Stabilization

The pulverized product (reaction product), triethylene glycol-bis[3-(3-t-butyl-4-hydroxy-5-methylphenyl)propionate] (product name: IRGANOX (registered trademark) 245, manufactured by BASF) serving as a hindered phenolic antioxidant, hydrotalcite (product name: Hycite (registered trademark) 713, manufactured by Clariant Plastics & Coatings (Japan) K.K.) serving as a layered double hydroxide, and melamine (manufactured by Mitsui Chemicals, Inc.) serving as a nitrogen-containing compound were added into the continuous polymerization apparatus, and thereafter, premixing was carried out using a Henschel mixer. The additive amounts of the hindered phenolic antioxidant, the hydrotalcite, and the melamine, with respect to 100 parts by mass of the oxymethylene copolymer, were determined as shown in Table 1.

The premixture was added into a hopper, and was then introduced into a same direction rotation-type biaxial extruder (inner diameter: 30 mm, L/D=25) at a rate of 3 kg/hr by a screw feeder. Thereafter, a molten material was continuously extruded under a reduced pressure of 21.3 kPa, under conditions of a cylinder temperature of 240° C. and a screw rotation number of 100 rpm, while performing vacuum devolatilization. At this time, the molten resin temperature was approximately 250° C.

Pelletization

The continuously extruded molten resin was immersed as a strand in a water tank for cooling, and was then supplied to a pelletizer for pelletization. The obtained pellets were dried at 140° C. for 3 hours, using a hot air dryer.

The pellets were added into a hopper again, and were then introduced into a same direction rotation-type biaxial extruder (inner diameter: 30 mm, L/D=25) at a rate of 10 kg/hr by a screw feeder. Thereafter, a molten material was continuously extruded under a reduced pressure of 21.3 kPa, under conditions of a cylinder temperature of 200° C. and a screw rotation number of 120 rpm, while performing vacuum devolatilization. At this time, the molten resin temperature was approximately 215° C.

The continuously extruded molten resin was immersed as a strand in a water tank for cooling, and was then supplied to a pelletizer for pelletization. The obtained pellets were dried at 120° C. for 12 hours, using a hot air dryer. These pellets were used as a final sample.

Examples 2 to 7

An oxymethylene copolymer resin composition was obtained in the same manner as that of Example 1, with the exception that the amounts of hydrotalcite and melamine were those as shown in Table 1.

Comparative Example 1

An oxymethylene copolymer resin composition was obtained in the same manner as that of Example 1, with the exception that hydrotalcite was not used.

Comparative Example 2

An oxymethylene copolymer resin composition was obtained in the same manner as that of Example 1, with the exception that the amount of hydrotalcite used was that as shown in Table 2.

Comparative Example 3

An oxymethylene copolymer was obtained in the same manner as that of Comparative Example 1, with the exception that TPB was not used.

Comparative Example 4

An oxymethylene copolymer was obtained in the same manner as that of Example 2, with the exception that TPB was not used.

Comparative Example 5

An oxymethylene copolymer was obtained in the same manner as that of Example 3, with the exception that TPB was not used.

<Yield>

With regard to the reaction products obtained in the examples and the comparative examples, the yield was calculated according to the following equation:

Yield (%)=(yield per hour (kg/hr) of reaction product discharged after termination of polymerization reaction)×(POM content rate (% by weight) of reaction product)/(total monomer amount supplied per hour (kg/hr)).

The POM content rate of the reaction product in the above equation was obtained by the following procedures. That is, after termination of the polymerization reaction in each of the examples and the comparative examples, a part of the reaction product was recovered, and the weight thereof (hereinafter referred to as "A g") was measured. Subsequently, in order to remove unreacted monomers, the reaction product was washed with acetone twice, and the acetone and the remaining unreacted monomers were then vacuum-dried in a vacuum dryer at 60° C. for 2 hours. After completion of the vacuum drying, the weight (B g) was measured. The POM content rate was calculated according to the following equation:

$$POM \text{ content rate } (\% \text{ by weight}) = B(g)/A(g) \times 100.$$

The results are shown in Tables 1 and 2.

<MFR>

The MFR of the final sample obtained in each of the examples or the comparative examples was measured in accordance with ASTM-D1238 (at 190° C. and under a load of 2.16 kg). The results are shown in Tables 1 and 2.

A small MFR value means a high molecular weight.

Automobilindustrie VDA275 (Determination of Formaldehyde from Vehicle Interior with Modified Flask Method).

<Amount of HCHO Generated Under Humidified Conditions>

The amount of formaldehyde (HCHO) generated (unit: mg/kg) from a molded body obtained using the pellets as a final sample, after the pellets had been preserved under humidified conditions, was measured according to the following procedures. 1) The pellets as a final sample were preserved for 24 hours under the environment of 80° C. and 98% RH, and were then pre-dried at 80° C. for 4 hours. Thereafter, using the molding machine SAV-30-30 manufactured by SANJO SEIKI Co., Ltd., the pellets were molded into a disk-shaped test piece having a diameter of 50 mm and a thickness of 3 mm, at a cylinder temperature of 230° C. 2) The obtained test piece was left at rest overnight in a constant temperature and humidity room at 23° C. in 50±5% RH. 3) On the following day, the amount of formaldehyde generated from the test piece was measured in accordance with the method described in Verband der Automobilindustrie VDA275 (Determination of Formaldehyde from Vehicle Interior with Modified Flask Method).

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Polymerization catalyst | BF3 | mmol/mol-TOX | 0.03 | 0.03 | 0.03 | 0.03 | 0.03 | 0.03 | 0.03 |
| | TPB | mmol/mol-TOX | 0.0003 | 0.0003 | 0.0003 | 0.0003 | 0.0003 | 0.0003 | 0.0003 |
| Additives | Antioxidant | phr | 0.3 | 0.3 | 0.3 | 0.3 | 0.3 | 0.3 | 0.3 |
| | Hydrotalcite | phr | 0.005 | 0.01 | 0.05 | 0.2 | 0.5 | 0.05 | 0.05 |
| | Melamine | phr | 0.05 | 0.05 | 0.05 | 0.05 | 0.05 | 0.01 | 0.3 |
| Yield | Product/all monomers | % | 81 | 81 | 81 | 81 | 81 | 81 | 81 |
| MFR | 190° C., 2.16 kg | g/10 min | 8.6 | 8.7 | 8.6 | 8.8 | 8.8 | 9.1 | 8.8 |
| Amount of HCHO generated | Initial stage | mg/kg-POM | 11.6 | 10.3 | 9.6 | 12.3 | 13.4 | 10.1 | 12.0 |
| | Humidified | mg/kg-POM | 14.5 | 9.4 | 9.6 | 12.0 | 13.5 | 9.9 | 13.4 |
| | Difference (humidified - initial stage) | mg/kg-POM | 2.9 | −1.0 | 0.1 | −0.3 | 0.1 | −0.2 | 1.4 |

TABLE 2

| | | | Comp. Ex. 1 | Comp. Ex. 2 | Comp. Ex. 3 | Comp. Ex. 4 | Comp. Ex. 5 |
|---|---|---|---|---|---|---|---|
| Polymerization catalyst | BF3 | mmol/mol-TOX | 0.03 | 0.03 | 0.03 | 0.03 | 0.03 |
| | TPB | mmol/mol-TOX | 0.0003 | 0.0003 | 0 | 0 | 0 |
| Additives | Antioxidant | phr | 0.3 | 0.3 | 0.3 | 0.3 | 0.3 |
| | Hydrotalcite | phr | 0 | 0.001 | 0 | 0.01 | 0.05 |
| | Melamine | phr | 0.05 | 0.05 | 0.05 | 0.05 | 0.05 |
| Yield | Product/all monomers | % | 81 | 81 | 75 | 75 | 75 |
| MFR | 190° C., 2.16 kg | g/10 min | 9.5 | 8.8 | 9.3 | 8.6 | 8.7 |
| Amount of HCHO generated | Initial stage | mg/kg-POM | 20.6 | 18.5 | 15.9 | 10.4 | 9.7 |
| | Humidified | mg/kg-POM | 25.3 | 24.7 | 18.1 | 15.1 | 16.2 |
| | Difference (humidified - initial stage) | mg/kg-POM | 4.7 | 6.3 | 2.2 | 4.7 | 6.5 |

<Initial amount of HCHO Generated>

The amount of formaldehyde (HCHO) generated (unit: mg/kg) from a molded body obtained using the pellets as a final sample was measured according to the following procedures. 1) The pellets as a final sample were pre-dried at 80° C. for 3 hours. Thereafter, using the molding machine SAV-30-30 manufactured by SANJO SEIKI Co., Ltd., the pellets were molded into a disk-shaped test piece having a diameter of 50 mm and a thickness of 3 mm, at a cylinder temperature of 230° C. 2) The obtained test piece was left at rest overnight in a constant temperature and humidity room at 23° C. in 50±5% RH. 3) On the following day, the amount of formaldehyde generated from the test piece was measured in accordance with the method described in Verband der <Analysis of Components in Composition>

The components contained in the final sample obtained in Example 2 were analyzed. Specific procedures and results are as follows.

(i) Oxymethylene Unit and Oxyalkylene Unit Containing 2 or More Carbon Atoms

The oxyalkylene unit contained in the final sample obtained in Example 2 (i.e. the pellets of the oxymethylene copolymer resin composition) was quantified by analyzing according to proton nuclear magnetic resonance (1H-NMR). The specific method is as follows.

For preparation of the oxymethylene copolymer in Example 2, 1,3,5-trioxane was used as a main monomer, and 1,3-dioxolane was used as a comonomer. Thus, as an oxyalkylene unit containing 2 or more carbon atoms, an oxyethylene unit was a target to be quantified.

The temperature of the final sample obtained in Example 2 was decreased to a glass transition point or lower, using liquid nitrogen, and the final sample was then pulverized by milling to obtain a pulverized product. The pulverized product was sieved to collect powders. The powders were weighed, and were then dissolved in 1,1,1,3,3,3-hexafluoroisopropanol-D2 (purity: 99%). The obtained solution was subjected to 1H-NMR analysis.

As an NMR apparatus, AVANCEIII500 manufactured by BRUKER was used, and identification and quantification were carried out.

The results are shown in FIG. 1. As a result of the quantification, the amount of the oxymethylene unit was 98.7 moles, and the amount of the oxyethylene unit was 1.3 moles, with respect to the total 100 moles of the oxymethylene unit and the oxyethylene unit.

(ii) Derivative of Aryl Boron Fluoride Compound

According to liquid chromatography/electrospray ionization mass spectrometry (LC-MS(ESI-)), the derivative of the aryl boron fluoride compound in the final sample obtained in Example 2 was quantified.

Hexafluoroisopropanol was added to the final sample obtained in Example 2, and the final sample was completely dissolved therein, so as to obtain a solution A. Methanol was weighed in a vial bottle, and the solution A was then added dropwise thereto, so that a resin was precipitated. The total amount of a soluble part was recovered, methanol was then added thereto, and the obtained mixture was subjected to LC-MS(ESI-) analysis. The measurement results are shown in FIG. 2.

Since the final sample obtained in Example 2 is an oxymethylene copolymer obtained using tris(pentafluorophenyl)borane trihydrate as aryl boron fluoride, when this final sample was subjected to the aforementioned analysis, a fluorine adduct of tris(pentafluorophenyl)borane was detected.

The solution for production of a calibration curve used in the quantification was prepared by dissolving 20 mg of a standard preparation of tris(pentafluorophenyl)borane trihydrate in 2 mL of hexafluoroisopropanol, and then serially diluting the obtained solution with methanol. When this solution was subjected to LC-MS(ESI-) analysis, tris(pentafluorophenyl)borane was detected as a hexafluoroisopropanol adduct, or a methanol adduct, or a water adduct, as shown in FIG. 3. A total of the area values of individual derivatives was calculated as being equivalent to tris(pentafluorophenyl)borane.

As a result of the quantification, it was found that 0.5 μg of a tris(pentafluorophenyl)borane derivative was comprised with respect to 1 g of the oxymethylene copolymer. The yield was 25%, with respect to the amount of the tris(pentafluorophenyl)borane trihydrate used upon the preparation of the oxymethylene copolymer.

(iii) Layered Double Hydroxide

With regard to hydrotalcite (hereinafter also referred to as "HT") used as a layered double hydroxide, an ash obtained after the burning of the final sample obtained in Example 2 was quantified by XRD analysis.

The sample was prepared by the following procedures. The final sample obtained in Example 2 (50 g) was burned at 280° C. for 7 hours, and was then burned in an electric furnace at 600° C. for 1 hour, so as to obtain 0.003 g of an ash. The obtained ash was measured using an X-ray diffractometer (MiniFlex 600, manufactured by RIGAKU). The results are shown in FIG. 4. From the measurement results, the ash was identified to be a layered double hydroxide. Taking into consideration a reduction in the weight due to burning, the resultant was quantified as a layered double hydroxide.

Besides, as shown in FIG. 5, by measuring a burned product of magnesium hydroxide, a burned product of aluminum monostearate, a burned product of a mixture consisting of magnesium hydroxide and aluminum monostearate, and a burned product of hydrotalcite, it was confirmed that the hydrotalcite comprised in the oxymethylene copolymer can be identified by XRD analysis.

As a result of the quantification, it was found that 0.005 g of hydrotalcite was comprised with respect to 50 g of the final sample obtained in the above Example 2.

(ii") Boron Trifluoride Compound

The sample obtained in Example 2 (i.e. the pellets of the oxymethylene copolymer resin composition) was dissolved in hydrochloric acid. The obtained solution was analyzed using an ICP emission spectrophotometric analyzer (ICP-OES Optima 8300 DV, manufactured by PerkinElmer), and the boron amount (B3) was quantified. The boron amount (B2) derived from the boron trifluoride compound was calculated according to the following equation (2):

$$(B2)=(B3)-(B1) \qquad (2)$$

wherein B3 represents the total boron amount in the sample, B2 represents the amount of boron derived from the boron trifluoride compound in the sample, and B1 represents the amount of boron derived from the aryl boron fluoride compound in the sample, wherein B1 was obtained by converting the concentration of the aryl boron fluoride compound obtained by the aforementioned LC-MS analysis to a boron amount.

As a result of the quantification, the boron amount (B2) derived from the boron trifluoride compound, which was comprised in 1 g of the oxymethylene copolymer, was found to be 3.5 ppm. Besides, from the previously mentioned HPLC results, the boron amount (B1) derived from the aryl boron fluoride compound was set to be 0.01 ppm, and the calculation was carried out. Therefore, the value of B1/B2 (molar ratio) was 0.003.

The invention claimed is:

1. An oxymethylene copolymer resin composition, which comprises:
(i) an oxymethylene copolymer comprising an oxymethylene unit and an oxyalkylene unit containing 2 or more carbon atoms,
(ii) a fluorine adduct of a boron compound having 1 to 3 aryl groups containing fluorine atoms, and
(iii) a layered double hydroxide,
wherein (ii) the fluorine adduct of the boron compound is derived from (ii') a boron compound and (ii") a boron trifluoride compound represented by $BF_3(\alpha)_m$, wherein m represents 0 or 1, and α represents alkyl ether containing 2 to 20 carbon atoms, tetrahydrofuran, or phenol,
wherein the layered double hydroxide is a hydrotalcite,
wherein (ii') the boron compound is at least one selected from the group consisting of tris(pentafluorophenyl)borane, bis(pentafluorophenyl)fluoroborane, pentafluorophenyldifluoroborane, tris(2,3,4,5-tetrafluorophenyl)boron, tris(2,3,4,6-tetrafluorophenyl)boron, tris(2,3,5,6-tetrafluorophenyl)boron, tris(2,3,5-trifluorophenyl)boron, tris(2,4,6-trifluorophenyl)boron, tris(2,3-difluorophenyl)boron, tris(2,3,5,6-tetrafluoro-4-methylphenyl)boron, tris(2,3,4,6-tetrafluoro-5-methylphenyl)boron, tris(2,4,5-trifluoro-6- methylphenyl)boron, tris(2,3,6-trifluoro-4-methylphenyl)boron, tris(2,4,6-trifluoro-3-methylphenyl)boron, tris(2,6-difluoro-3-methylphenyl)boron, tris(2,4-difluoro-5-methylphenyl)boron, tris(3,5-difluoro-2-methylphenyl)boron, tris(4-methoxy-2,3,5,6-tetrafluorophenyl)boron, tris(3-methoxy-2,4,5,6-tetrafluorophenyl) boron, tris(2-methoxy-3,5,6-trifluorophenyl)boron, tris (3-methoxy-2,5,6-trifluorophenyl)boron, tris(3-methoxy-2,4,6-trifluorophenyl)boron, tris(2-methoxy-3,5-difluorophenyl)boron, tris(3-methoxy-2,6-difluorophenyl)boron, tris(3-methoxy-4,6-difluorophenyl)boron, tris(2-methoxy-4,6-difluorophenyl)boron, tris(4-methoxy-2,6-difluorophenyl)boron, and hydrates thereof, wherein a content of (iii) the layered double hydroxide is 0.003 to 1 parts by mass, based on 100 parts by mass of (i) the oxymethylene copolymer, wherein the amount of (ii') the boron compound is $1 \times 10^{-8}$ mol to $1 \times 10^{-5}$ mol, with respect to 1 mol of the oxymethylene unit, wherein the amount of (ii") the boron trifluoride compound is $1 \times 10^{-6}$ mol to $1 \times 10^{-3}$ mol, with respect to 1 mol of the oxymethylene unit, wherein the molar ratio B1/B2 of the amount of boron derived from (ii') the boron compound (B1) to the amount of boron derived from (ii") the boron trifluoride compound (B2) is 0.0001 or more and less than 1.

2. The oxymethylene copolymer resin composition according to claim 1, which further comprises (iv) 0.01 to 1 part by mass of hindered phenolic antioxidant, based on 100 parts by mass of (i) the oxymethylene copolymer.

3. The oxymethylene copolymer resin composition according to claim 1, wherein (ii") the boron compound is at least one type selected from the group consisting of tris (pentafluorophenyl)borane, bis(pentafluorophenyl)fluoroborane, pentafluorophenyldifluoroborane, and their hydrates.

4. The oxymethylene copolymer resin composition according to claim 1, wherein the molar ratio B1/B2 of the amount of boron derived from (ii') the boron compound (B1) to the amount of boron derived from (ii") the boron trifluoride compound (B2) is 0.0001 to 0.1.

5. The oxymethylene copolymer resin composition according to claim 1, which further comprises (v) 0.01 to 0.3 parts by mass of nitrogen-containing compound selected from the group consisting of an amino-substituted triazine compound, a polyamide resin, a hindered amine compound, and a dicarboxylic acid hydrazide, based on 100 parts by mass of (i) the oxymethylene copolymer.

6. The oxymethylene copolymer resin composition according to claim 5, wherein (v) the nitrogen-containing compound is at least one type selected from the group consisting of an amino-substituted triazine compound, a polyamide resin, and a hindered amine compound.

7. A method for producing the oxymethylene copolymer resin composition according to claim 6, comprising:
performing a copolymerization reaction, using (i) trioxane as a main monomer, (i") cyclic ether and/or cyclic formal having at least one carbon-carbon bond, as a comonomer, and (ii') the boron compound and (ii") the boron trifluoride compound, as reaction initiators, to obtain a reaction product comprising (i) an oxymethylene copolymer, and adding (iii) the layered double hydroxide to the obtained reaction product, wherein the additive amount of (iii) the layered double hydroxide is 0.003 to 1 parts by mass, based on 100 parts by mass of (i) the oxymethylene copolymer.

8. The method for producing an oxymethylene copolymer resin composition according to claim 7, which further comprises adding (iv) 0.01 to 1 part by mass of hindered phenolic antioxidant, based on 100 parts by mass of (i) the oxymethylene copolymer.

9. The method for producing an oxymethylene copolymer resin composition according to claim 7, wherein the α is at least one type selected from the group consisting of dimethyl ether, diethyl ether, and dibutyl ether.

10. The method for producing an oxymethylene copolymer resin composition according to claim 9, wherein (ii') the boron compound is at least one type selected from the group consisting of tris(pentafluorophenyl)borane, bis(pentafluorophenyl)fluoroborane, pentafluorophenyldifluoroborane, and their hydrates.

11. The method for producing an oxymethylene copolymer resin composition according to claim 7, wherein the molar ratio B1/B2 of the amount of boron derived from (ii') the boron compound (B1) to the amount of boron derived from (ii") the boron trifluoride compound (B2) is 0.0001 to 0.1.

12. The method for producing an oxymethylene copolymer resin composition according to claim 7, wherein (ii') the boron compound and (ii") the boron trifluoride compound are previously mixed with each other to prepare a reaction initiator mixture, and the reaction initiator mixture is used.

13. The method for producing an oxymethylene copolymer resin composition according to claim 7, which comprises adding (v) 0.01 to 0.3 parts by mass of nitrogen-containing compound selected from the group consisting of an amino-substituted triazine compound, a polyamide resin, a hindered amine compound, and a dicarboxylic acid hydrazide, based on 100 parts by mass of (i) the oxymethylene copolymer.

14. The method for producing an oxymethylene copolymer resin composition according to claim 13, wherein (v) the nitrogen-containing compound is at least one type selected from the group consisting of an amino-substituted triazine compound, a polyamide resin, and a hindered amine compound.

* * * * *